(12) United States Patent
Iwami et al.

(10) Patent No.: US 7,852,503 B2
(45) Date of Patent: Dec. 14, 2010

(54) DIGITAL CAMERA AND PRINTER

(75) Inventors: Takeshi Iwami, Kanagawa (JP);
Akitoshi Yamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1251 days.

(21) Appl. No.: 10/630,808

(22) Filed: Jul. 31, 2003

(65) Prior Publication Data

US 2004/0070672 A1   Apr. 15, 2004

(30) Foreign Application Priority Data

Aug. 5, 2002   (JP) .............................. 2002-228029
Jul. 4, 2003   (JP) .............................. 2003-192161

(51) Int. Cl.
*G06F 3/12*   (2006.01)
*G03B 17/48*   (2006.01)
*H04N 5/225*   (2006.01)

(52) U.S. Cl. .................... 358/1.15; 396/429; 348/207.2

(58) Field of Classification Search ................ 358/1.15, 358/1.1, 1.13, 442; 348/207.2, 207.1, 375; 396/429, 422, 544; 340/636, 5.61, 5.64; 709/201, 203, 229, 227, 228, 230, 231; 455/3.01, 455/462.2, 151.2; 380/270; 381/311; 235/426.46, 235/472.02; 370/913; 345/2.3
See application file for complete search history.

(56) References Cited

U.S. PATENT DOCUMENTS

| 6,104,886 | A | * | 8/2000 | Suzuki et al. | 396/429 |
|---|---|---|---|---|---|
| 6,115,137 | A | | 9/2000 | Ozawa et al. | 358/1.6 |
| 6,507,358 | B1 | | 1/2003 | Mori et al. | 348/42 |
| 6,806,978 | B1 | * | 10/2004 | Tamura et al. | 358/1.15 |
| 7,119,835 | B2 | * | 10/2006 | Gennetten et al. | 348/207.2 |
| 7,170,627 | B2 | * | 1/2007 | Tanaka et al. | 358/1.15 |
| 7,324,226 | B2 | * | 1/2008 | Fritz et al. | 358/1.15 |
| 2003/0016378 | A1 | * | 1/2003 | Ozawa et al. | 358/1.13 |
| 2003/0067620 | A1 | | 4/2003 | Masumoto et al. | 358/1.13 |
| 2003/0067638 | A1 | | 4/2003 | Yano | 358/540 |
| 2003/0081235 | A1 | | 5/2003 | Tanaka et al. | 358/1.13 |
| 2003/0081237 | A1 | | 5/2003 | Ogiwara et al. | 358/1.14 |
| 2003/0081251 | A1 | | 5/2003 | Tanaka et al. | 358/1.15 |
| 2003/0210331 | A1 | * | 11/2003 | Battles et al. | 348/211.2 |
| 2004/0036895 | A1 | * | 2/2004 | Yano et al. | 358/1.6 |

OTHER PUBLICATIONS

Chinese Office Action issued in Chinese Application No. 2005101171925 dated Aug. 7, 2009, and an English-language translation thereof.
U.S. Appl. No. 10/368,600, filed Feb. 20, 2003, Masao Kato, et al.
U.S. Appl. No. 10/608,023, filed Jun. 30, 2003, Kentaro Yano, et al.
U.S. Appl. No. 10/630,794, filed Jul. 31, 2003, Satoshi Ogiwara, et al.

* cited by examiner

*Primary Examiner*—Edward L Coles
*Assistant Examiner*—Neil R McLean
(74) *Attorney, Agent, or Firm*—Fitzpatrick, Cella, Harper & Scinto

(57) ABSTRACT

Before completion of a print process of a digital image, a user can be informed that a cable can be disconnected from a digital camera or printer, and that the digital camera is ready to photograph. To this end, a photo-direct (PD) printer transmits a JobDataDone command indicating that all digital images to be printed are received in a digital camera. Upon reception of the JobDataDone command, the digital camera displays, on a display, information indicating that a cable can be disconnected from the digital camera or PD printer.

10 Claims, 17 Drawing Sheets

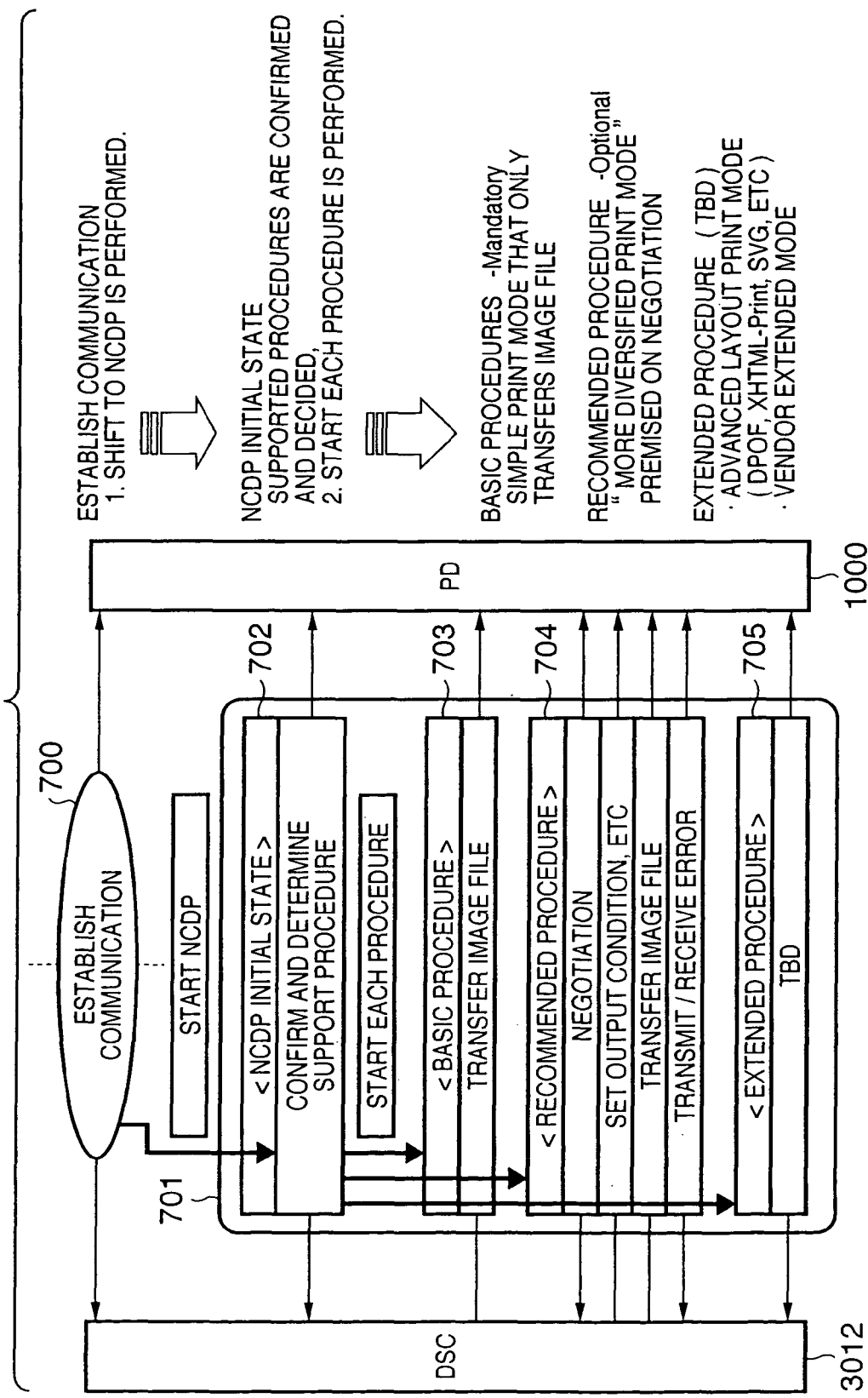

FIG. 8

| | TYPE OF COMMAND | BASIC | RECOMMENDED | EXTENDED | FUNCTION |
|---|---|---|---|---|---|
| PRINTER | NCDPStart | ○ | ○ | ○ | START NCDP |
| | ProcedureStart | ○ | ○ | ○ | START BASIC, RECOMMENDED, OR EXTENDED MODE |
| | NCDPEnd | ○ | ○ | ○ | TERMINATE FROM NCDP |
| | Capability | | ○ | | NOTIFY PRINTER FUNCTION |
| | GetImage | ○ | ○ | | ACQUIRE DIGITAL IMAGE |
| | StatusSend | | ○ | | NOTIFY FATAL ERROR |
| | PageStart | | ○ | | NOTIFY PRINT START (UPON FEEDING SHEET FOR EACH PAGE) |
| | PageEnd | | ○ | | NOTIFY PRINT END (UPON DISCHARGING SHEET FOR EACH PAGE) |
| | JobEnd | ○ | ○ | | NOTIFY END OF PRINT JOB |
| | JobDataDone | ○ | ○ | | NOTIFY COMPLETION OF RECEPTION OF JOB DATA |
| DIGITAL CAMERA | JobStart | ○ | ○ | | PRINT START MESSAGE |
| | JobAbort | | ○ | | PRINT ABORT MESSAGE |
| | JobContinue | | ○ | | PRINT RESTART MESSAGE |

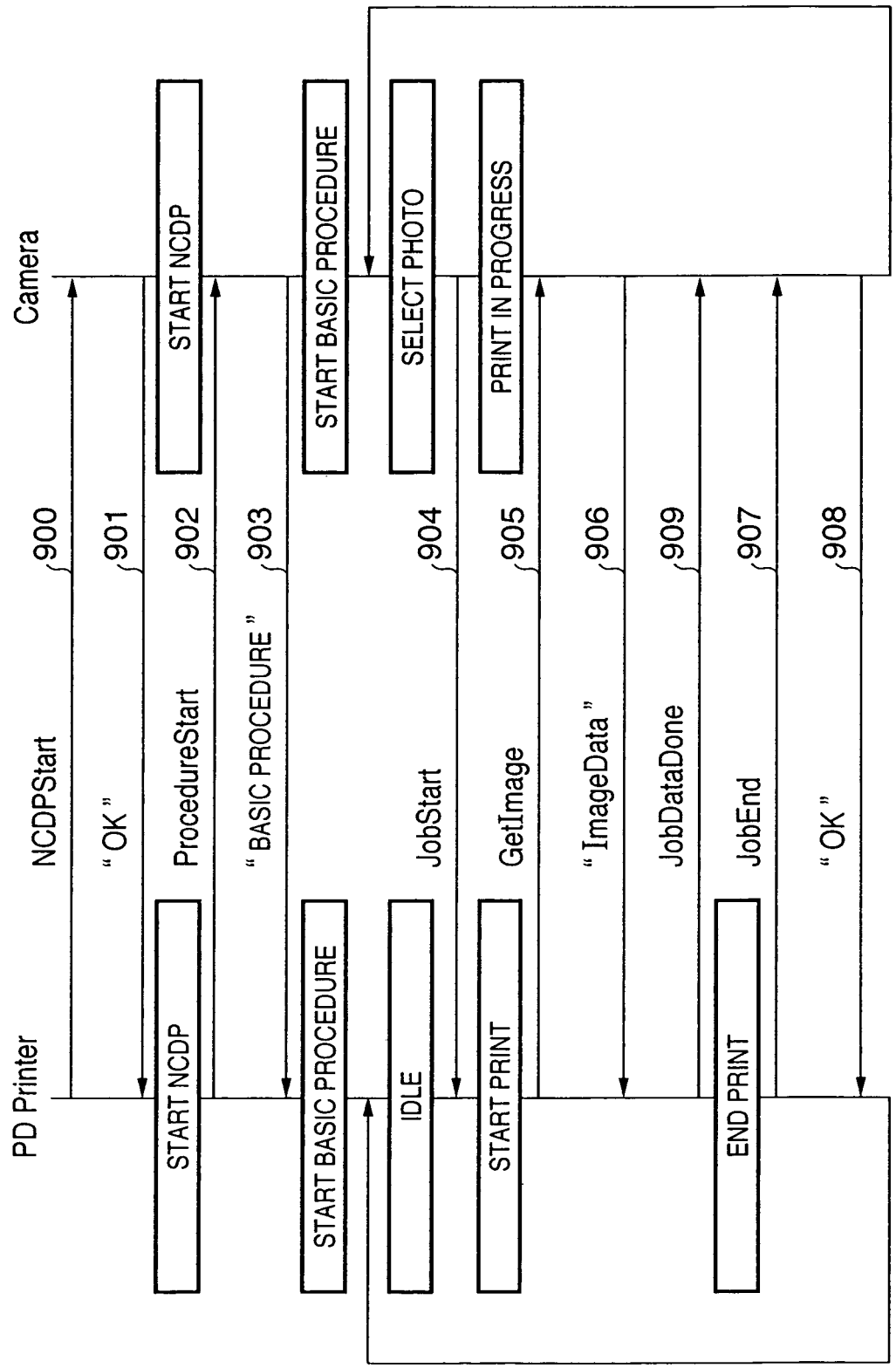

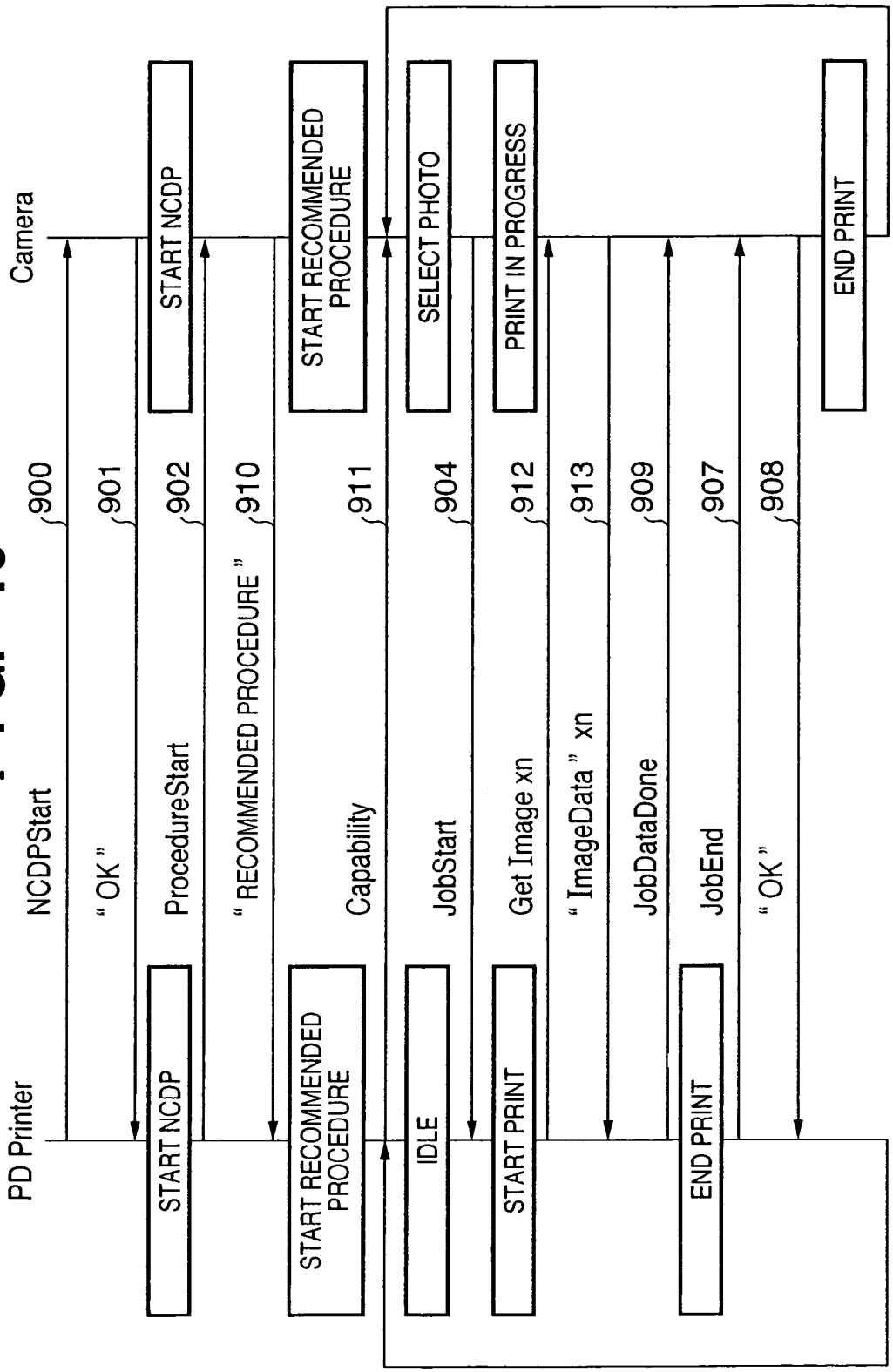

FIG. 12

PRINT IN PROGRESS · · ·

DO NOT REMOVE CABLE

FIG. 13

PRINT IN PROGRESS · · ·

CABLE CAN BE REMOVED.
(PHOTOGRAPHING CAN BE MADE)

FIG. 16

PRINT IN PROGRESS · · ·

DO NOT BRING CAMERA
OUTSIDE COMMUNICATION AREA

F I G. 17

PRINT IN PROGRESS · · ·

CAMERA CAN BE BROUGHT
OUTSIDE COMMUNICATION AREA
(PHOTOGRAPHING CAN BE MADE)

DIGITAL CAMERA AND PRINTER

FIELD OF THE INVENTION

The present invention relates to an image input apparatus (e.g., a digital camera) and image output apparatus (e.g., printer).

BACKGROUND OF THE INVENTION

In recent years, a system which directly connects a digital camera and printer via a cable, directly transmits a digital image in the digital camera to the printer, and controls the printer to print the image (to be referred to as a photo direct print system hereinafter) has been proposed.

However, the current photo direct print system cannot inform the digital camera of completion of transmission of a digital image before completion of a print process. For this reason, before completion of the print process the digital camera cannot inform the user that the cable can be disconnected from the digital camera or printer and the camera is ready to photograph. Also, when the digital camera and printer are connected via a wireless link, the digital camera cannot inform the user that he or she can bring the digital camera outside the communication area with the printer. As a result, the user cannot quickly start photographing, and may lose a shutter chance. Such problem is also posed in a system in which a digital camera is directly connected to an image recording apparatus that records a digital image directly transmitted from the digital camera on a randomly accessible recording medium via a cable or a wireless link.

SUMMARY OF THE INVENTION

The present invention has been made to solve the aforementioned problems, and can inform the user before completion of a print process of a digital image that a cable can be disconnected from a digital camera, and thereby prevent the user from losing a shutter chance as much as possible. The present invention can also inform the user before completion of a print process of a digital image that a digital camera is ready to photograph, and thereby prevent the user from losing a shutter chance as much as possible. The present invention can also inform the user before completion of a print process of a digital image that he or she can bring a digital camera outside the communication area of a printer or image recording apparatus, and thereby prevent the user from losing a shutter chance as much as possible.

A digital camera according to the present invention is a digital camera having a function of directly transmitting a digital image to a printer, characterized by displaying, before completion of a print process of a digital image transmitted to the printer, information indicating that a cable can be disconnected from the digital camera or the printer.

A digital camera according to the present invention is a digital camera having a function of directly transmitting a digital image to a printer, characterized by displaying, before completion of a print process of a digital image transmitted to the printer, information indicating that the digital camera is ready to photograph.

A printer according to the present invention is a printer for printing a digital image directly transmitted from a digital camera, characterized by having a function of informing the digital camera of reception of all digital images transmitted from the digital camera.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a view for explaining communication procedures in the NCDP system;

FIG. 8 is a view for explaining commands in the NCDP system;

FIG. 9 is a chart for explaining a print sequence based on "BASIC PROCEDURE" of the NCDP system;

FIG. 10 is a chart for explaining a print sequence based on "RECOMMENDED PROCEDURE" of the NCDP system;

FIG. 12 shows an example of information displayed before the digital camera according to the embodiment of the present invention receives a JobDataDone command;

FIG. 13 shows an example of information displayed after the digital camera according to the embodiment of the present invention receives the JobDataDone command;

FIG. 16 shows another example of information displayed before the digital camera according to the embodiment of the present invention receives a JobDataDone command; and FIG. 17 shows another example of information displayed after the digital camera according to the embodiment of the present invention receives the JobDataDone command.

DETAILED DESCRIPTION OF THE PREFERRED EMBODIMENTS

Preferred embodiments of the present invention will be described hereinafter with reference to the accompanying drawings.

First Embodiment

Figure 1:
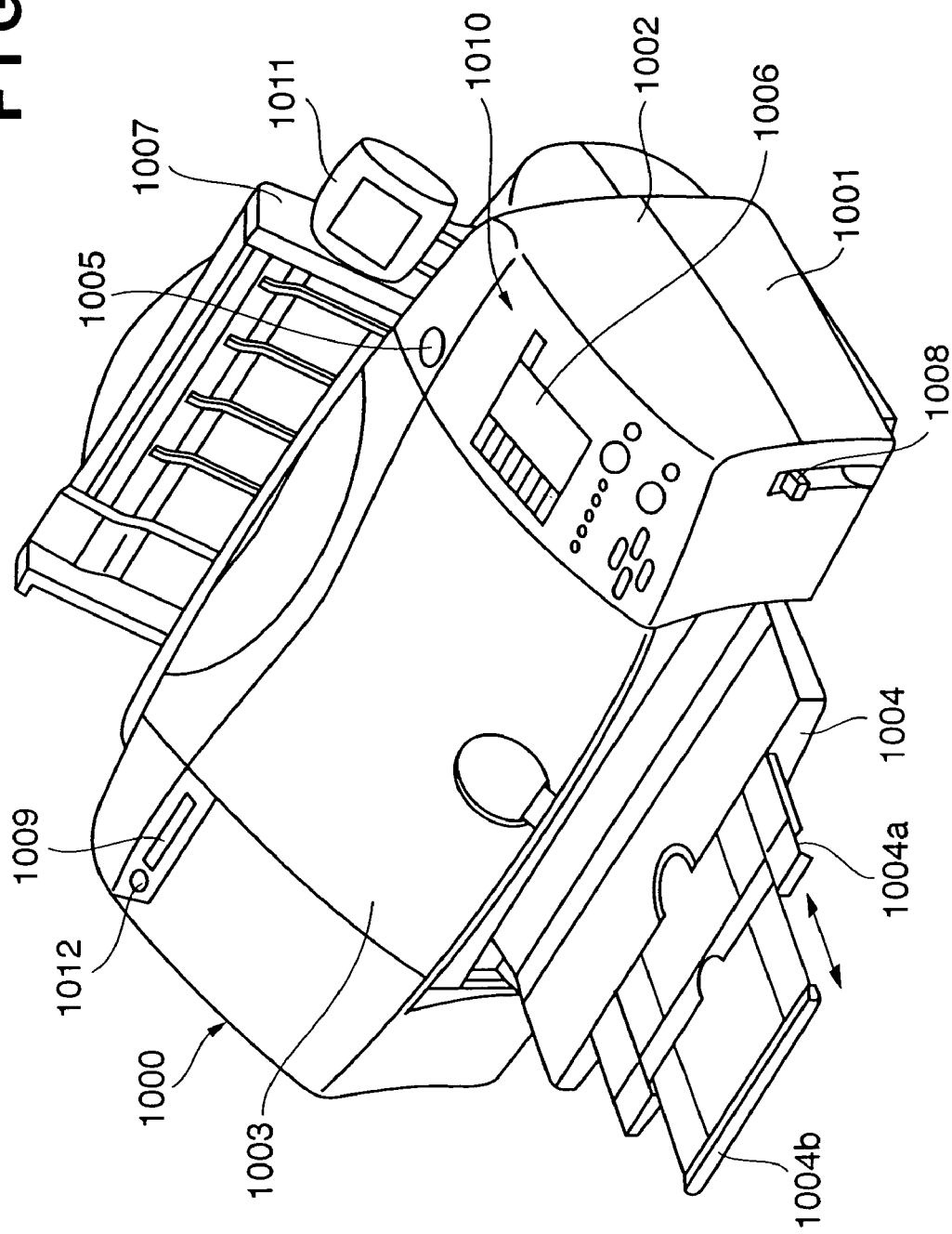
FIG. 1 is a schematic perspective view of a PD printer according to an embodiment of the present invention.

FIG. 1 is a schematic perspective view of a photo direct printer (to be referred to as a PD printer hereinafter) 1000 which mounts an NCDP (New Camera Direct Print) system as a direct print system in this embodiment. The PD printer 1000 has a function of printing data received from a host computer (PC), a function of printing a digital image directly read from a storage medium such as a memory card or the like, and a function of printing a digital image directly received from a digital camera.

Referring to FIG. 1, a main body which forms a housing of the PD printer 1000 according to this embodiment has a lower case 1001, an upper case 1002, an access cover 1003, and an exhaust tray 1004 as exterior members. The lower case 1001 nearly forms the lower half portion of the main body, and the upper case 1002 nearly forms the upper half portion of the main body. By combining these cases, a hollow structure which has a storage space that stores mechanisms to be described later is formed. Openings are respectively formed on the upper and front surfaces of the main body. One end portion of the exhaust tray 1004 is rotatably held by the lower case 1001, and rotation of the tray 1004 opens/closes the opening formed on the front surface of the lower case 1001. For this reason, upon making the printer execute a print process, the exhaust tray 1004 is rotated toward the front surface side to open the opening, so that paper sheets can be exhausted from the opening. The exhausted paper sheets are stacked on the exhaust trays 1004 in turn. The exhaust tray 1004 stores two auxiliary trays 1004a and 1004b. When these auxiliary trays are pulled out as needed, the loading area of paper sheets can be enlarged/reduced in three steps.

One end portion of the access cover 1003 is rotatably held by the upper case 1002 to be able to open/close the opening formed on the upper surface of the main body. When the access cover 1003 is opened, a printhead cartridge (not shown), ink tanks (not shown), or the like housed in the main body can be exchanged. Although not shown, when the access cover 1003 is opened/closed, a projection formed on the rear surface of the cover 1003 rotates a cover open/close lever. By detecting the rotation position of that lever using a microswitch or the like, the open/close state of the access cover is detected.

A power key 1005 is arranged on the upper surface of the upper case 1003 so that the user can press it. A control panel 1010, which comprises a liquid crystal display unit 1006, various key switches, and the like, is provided on the right side of the upper case 1002. The structure of the control panel 1010 will be described in detail later with reference to FIG. 2. Reference numeral 1007 denotes an automatic feeder which automatically conveys a paper sheet into the apparatus main body. Reference numeral 1008 denotes a paper gap select lever which is used to adjust the gap between the printhead and the paper sheet. Reference numeral 1009 denotes a card slot which receives an adapter that can receive a memory card. Via this adapter, a digital image stored in the memory card can be directly fetched and printed. As this memory card (PC card), for example, a compact flash® card, a smart media card, a memory stick, and the like, are available. Reference numeral 1011 denotes a viewer (liquid crystal display unit) which is detachable from the main body of this PD printer 1000, and is used to display an image for one frame, an index image, and the like, when the user wants to search images stored in the PC card for an image to be printed. Reference numeral 1012 denotes a USB terminal used to connect a digital camera 3012 (to be described later). Also, another USB connector used to connect a personal computer (PC) is provided on the rear surface of this PD printer 1000.

Figure 2:
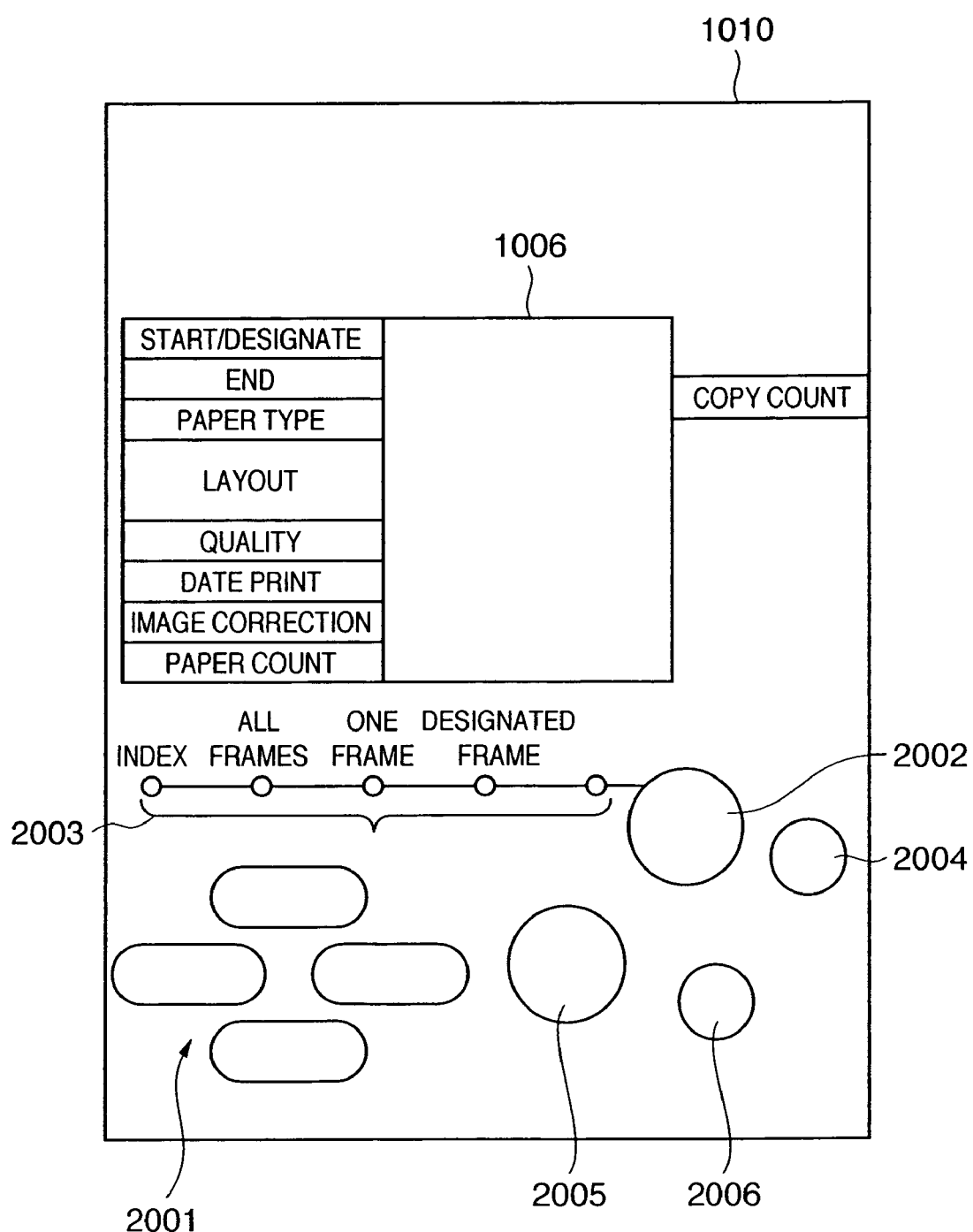
FIG. 2 is a schematic view of a control panel of the PD printer according to the embodiment of the present invention.

FIG. 2 is a schematic view of the control panel 1010 of the PD printer 1000 according to this embodiment.

Referring to FIG. 2, the liquid crystal display unit 1006 displays menu items used to set data associated with item names printed on the right and left sides of the unit 1006. The menu items include, e.g., an item indicating the first frame number of photos to be printed or a designated frame number of photograph to be printed (START/DESIGNATE), an item indicating the last frame number of photos to be printed (END), an item indicating the number of copies to be printed (COPY COUNT), an item indicating the type of paper sheet used in a print process (PAPER TYPE), an item indicating the number of photos to be printed in one paper sheet (LAYOUT), an item indicating a print quality (QUALITY), an item indicating whether or not to print a photographing date (DATE PRINT), an item indicating whether or not to print a photo after correction (IMAGE CORRECTION), an item indicating the number of paper sheets required for printing (PAPER COUNT), and the like. These items are selected or designated using cursor keys 2001. Reference numeral 2002 denotes a mode key. Every time this key is pressed, the type of print (INDEX, ALL FRAMES, ONE FRAME, and the like) can be switched, and a corresponding one of LEDs 2003 is turned on in accordance with the selected type of print. Reference numeral 2004 denotes a maintenance key which is used to do maintenance of the printer (e.g., cleaning of the printhead, and the like). Reference numeral 2005 denotes a print start key which is pressed when the start of a print process is instructed or when the maintenance setup is settled. Reference numeral 2006 denotes a print cancel key which is pressed when a print process or maintenance is canceled.

The arrangement of principal parts associated with the control of the PD printer 1000 of this embodiment will be described below with reference to FIG. 3. Note that the same reference numerals in FIG. 3 denote parts common to those in the above drawings, and a description thereof will be omitted.

Figure 3:
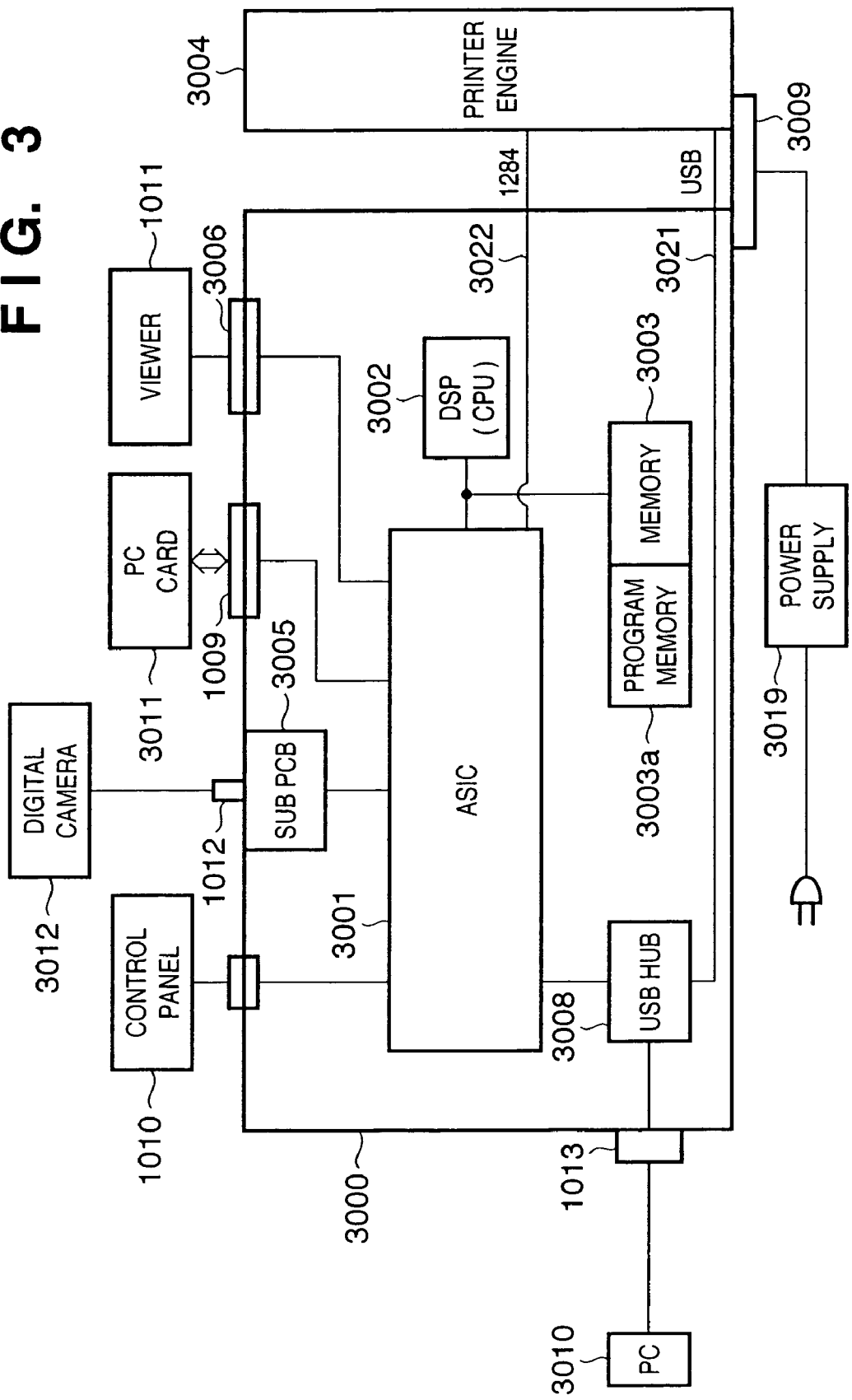
FIG. 3 is a block diagram showing the arrangement of principal part associated with control of the PD printer according to the embodiment of the present invention.

Referring to FIG. 3, reference numeral 3000 denotes a controller (control board). Reference numeral 3001 denotes an ASIC (dedicated custom LSI). The arrangement of the ASIC 3001 will be described later with reference to the block diagram of FIG. 4. Reference numeral 3002 denotes a DSP (digital signal processor), which includes a CPU and executes various kinds of control to be described later, and image processes such as conversion from a luminance signal (RGB) into a density signal (CMYK), scaling, gamma conversion, error diffusion, and the like. Reference numeral 3003 denotes a memory, which has a memory area that serves as a program memory 3003a for storing a control program to be executed by the CPU of the DSP 3002, a RAM area for storing a running program, and a work area for storing image data and the like. Reference numeral 3004 denotes a printer engine. In this embodiment, the printer is equipped with a printer engine of an ink-jet printer which prints a color image using a plurality of color inks. Reference numeral 3005 denotes a USB connector as a port for connecting the digital camera 3012. Reference numeral 3006 denotes a connector for connecting the viewer 1011. Reference numeral 3008 denotes a USB hub. When the PD printer 1000 executes a print process based on a digital image from a PC 3010, the USB hub 3008 allows data received from the PC 3010 to pass through it, and outputs the data to the printer engine 3004 via a USB 3021. In this way, the PC 3010 connected to the printer can execute a print process by directly exchanging data, signals, and the like with the printer engine 3004 (the printer serves as a normal PC printer). Reference numeral 3009 denotes a power supply connector, which inputs a DC voltage, which is converted from commercial AC power by a power supply 3011. The PC 3010 is a general personal computer. Reference numeral 3011 denotes a memory card (PC card) mentioned above; and reference numeral 3012 denotes a digital camera.

Note that signals are exchanged between this controller 3000 and printer engine 3004 via the USB 3021 or an IEEE1284 bus 3022.

The arrangement of the ASIC 3001 will be described below with reference to FIG. 4.

Figure 4:
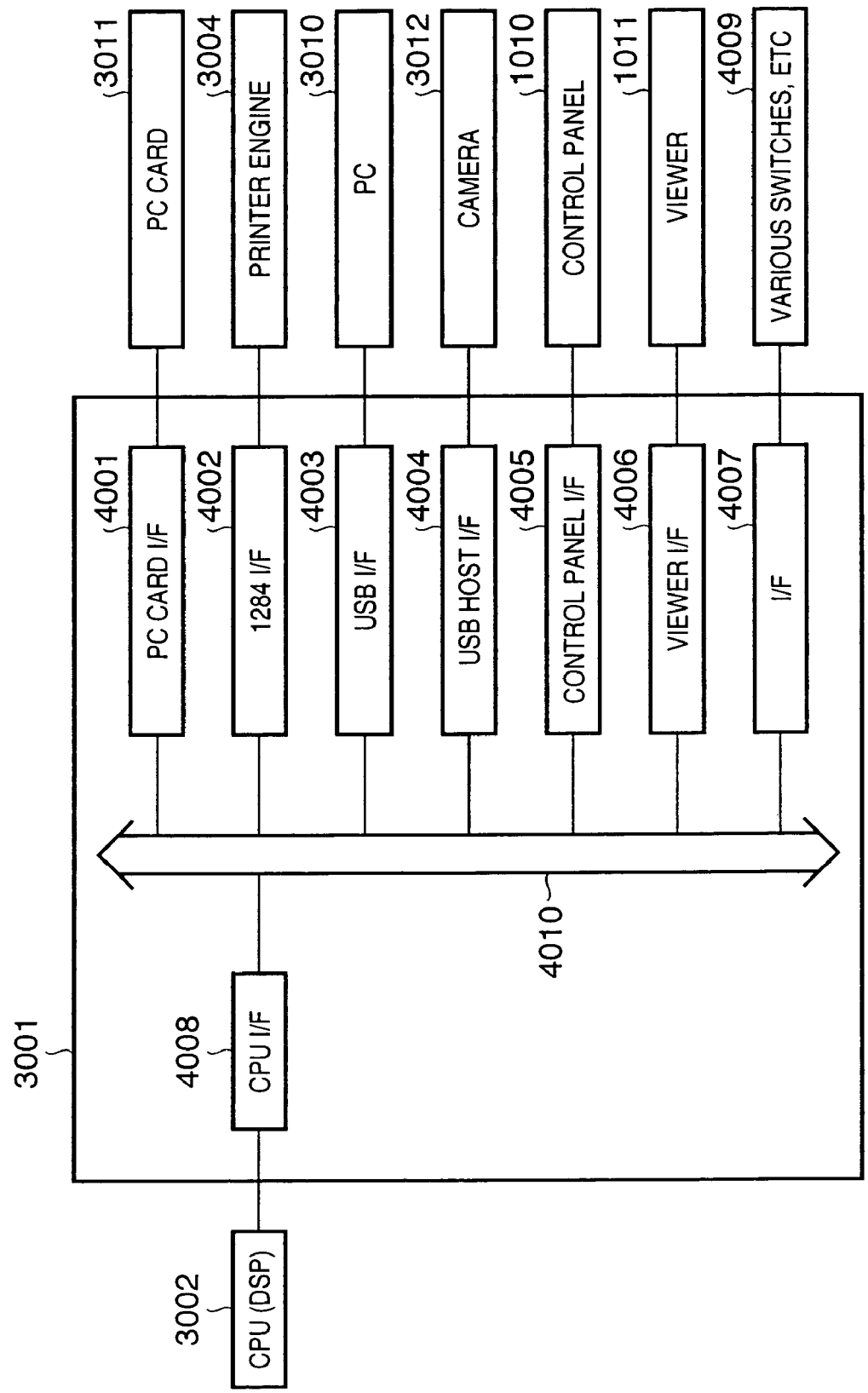
FIG. 4 is a block diagram showing the arrangement of an ASIC of the PD printer according to the embodiment of the present invention.

Referring to FIG. 4, reference numeral 4001 denotes a PC card interface, which is used to read a digital image stored in the inserted PC card 3011, and to write data in the PC card 3011. Reference numeral 4002 denotes an IEEE1284 interface, which is used to exchange data with the printer engine 3004. This IEEE1284 interface 4002 is a bus used when a digital image stored in the digital camera 3012 or PC card 3011 is to be printed. Reference numeral 4003 denotes a USB interface, which exchanges data with the PC 3010. Reference numeral 4004 denotes a USB host interface, which exchanges data with the digital camera 3012. Reference numeral 4005 denotes a control panel interface, which receives various operation signals from the control panel 1010, and outputs display data and the like to the display unit 1006. Reference numeral 4006 denotes a viewer interface, which controls display of a digital image on the viewer 1011. Reference numeral 4007 denotes an interface, which controls interfaces with various switches, LEDs 4009, and the like. Reference numeral 4008 denotes a CPU interface, which exchanges data with the DSP 3002. Reference numeral 4010 denotes an internal bus (ASIC bus), which interconnects these interfaces.

Figure 11:
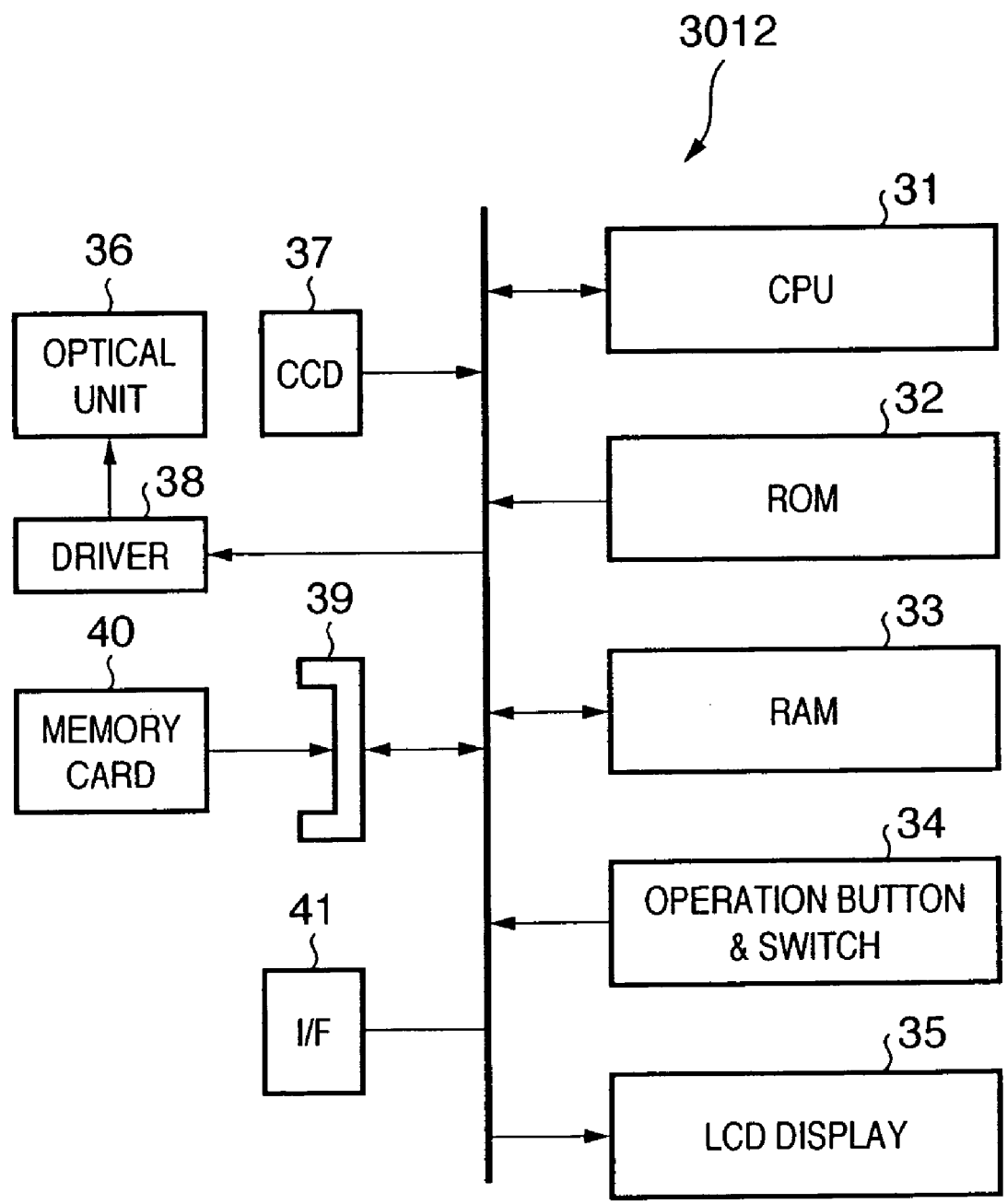
FIG. 11 is a block diagram showing the arrangement of a digital camera according to the embodiment of the present invention.

FIG. 11 is a block diagram of the digital camera 3012, which mounts the NCDP system as a direct print system of this embodiment and its user interface.

Referring to FIG. 11, reference numeral 31 denotes a CPU which controls the operation of the digital camera 3012; and reference numeral 32 denotes a ROM that stores the processing sequence (firmware) of the CPU 31 (note that the ROM comprises a rewritable nonvolatile memory (e.g., a flash memory) since the firmware version is updated as needed). Reference numeral 33 denotes a RAM which is used as a work area of the CPU 31; and reference numeral 34 denotes a console which includes a switch group used to make various operations. Reference numeral 35 denotes a liquid crystal display, which is used to confirm a sensed image, and to display a menu upon making various setups. In this embodiment, these components 34 and 35 serve as a user interface of the whole system when the digital camera serves as a member of the direct print system. Reference numeral 36 denotes an optical unit which mainly comprises a lens and its drive system. Reference numeral 37 denotes a CCD element; and reference numeral 38 denotes a driver which controls the optical unit 36 under the control of the CPU 31. Reference numeral 39 denotes a connector that receives a storage medium 40 (compact flash® memory card, a smart media card, or the like); and reference numeral 41 denotes as USB interface (the slave side of the USB) used to connect the PC or PD printer 1000 of this embodiment.

The arrangements of the PD printer 1000 and digital camera 3012 of this embodiment have been explained. An outline of the operation based on the above arrangement will be explained below.

<Normal PC Printer Mode>

This mode is a print mode for printing an image on the basis of print data sent from the PC 3010.

In this mode, when data from the PC 3010 is input via the USB connector 1013 (FIG. 3), it is directly sent to the printer engine 3004 via the USB hub 3008 and USB 3021, and a print process is executed based on the data from the PC 3010.

<Direct Print Mode from PC Card>

When the PC card 3011 is attached to or detached from the card slot 1009, an interrupt is generated, and the DSP 3002 can detect, based on this interrupt, whether or not the PC card 3011 is attached or detached (removed). When the PC card 3011 is attached, a compressed digital image (e.g., compressed by JPEG) stored in that PC card 3011 is read and stored in the memory 3003. After that, the compressed digital image is decompressed, and is stored in the memory 3003 again. When the user has issued a print instruction of that stored digital image, the image data is converted into print data that can be printed by the printer engine 3004 by executing conversion from RGB signals into YMCK signals, gamma correction, error diffusion, and the like, and the print data is output to the printer engine 3004 via the IEEE1284 interface 4002, thus printing an image.

<Direct Print Mode from Camera>

Figure 5:
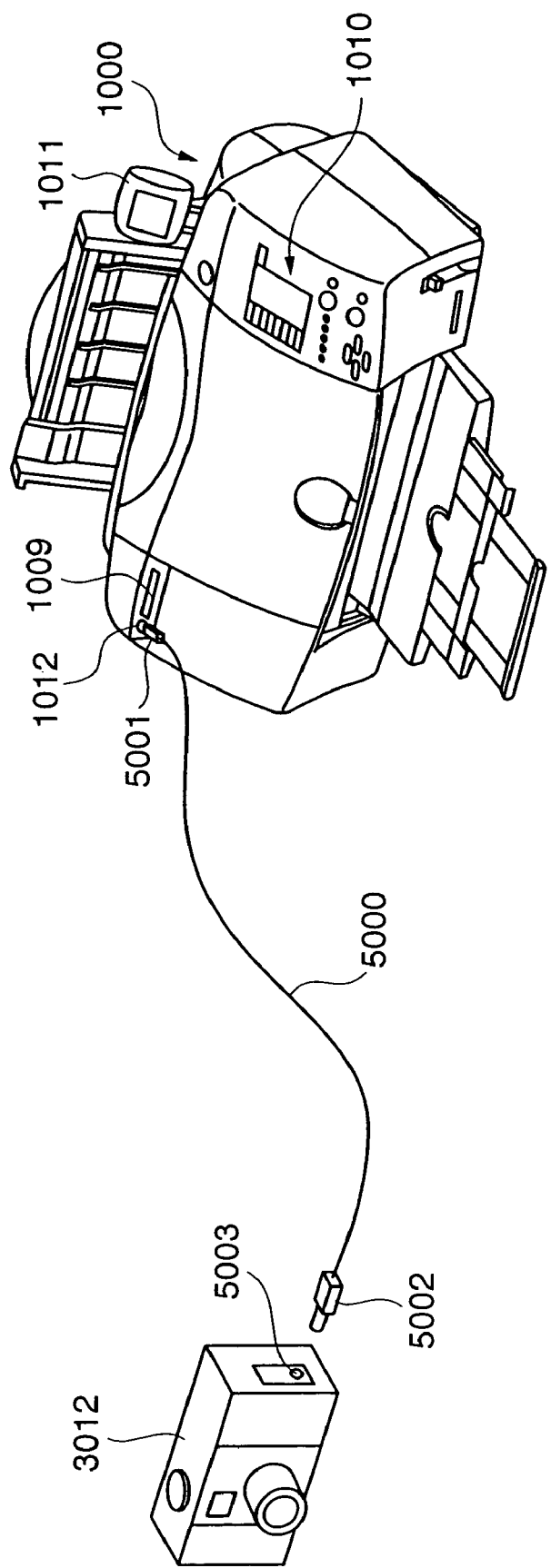
FIG. 5 is a view showing the connection state of the PD printer and a digital camera according to the embodiment of the present invention.

FIG. 5 shows the connection state of the PD printer 1000 and digital camera 3012 of this embodiment.

Referring to FIG. 5, a cable 5000 comprises a connector 5001 which is connected to the connector 1012 of the PD printer 1000, and a connector 5002 which is connected to a connector 5003 of the digital camera 3012. The digital camera 3012 can output a digital image stored in its internal memory via the connector 5003. Note that the digital camera 3012 can adopt various arrangements, e.g., an arrangement that comprises an internal memory as storage means, an arrangement that comprises a slot for receiving a detachable memory card, and so forth. When the PD printer 1000 and digital camera 3012 are connected via the cable 5000 shown in FIG. 5, a digital image output from the digital camera 3012 can be directly printed by the PD printer 1000. When the digital camera 3012 is connected to the PD printer 1000 via the cable 5000, various switches 34 and display 35 of the digital camera 3012 serve as a user interface of the system built by the digital camera 3012 and PD printer 1000.

When the digital camera 3012 is connected to the PD printer 1000, as shown in FIG. 5, and the control enters a direct print mode as a result of negotiation, a camera mark alone is displayed on the display unit 1006 on the control panel 1010, display and operations on the control panel 1010 are disabled, and display on the viewer 1011 is also disabled. Therefore, since only key operations at the digital camera 3012 and image display on the display 35 of the digital camera 3012 are enabled, the user can designate print setups using that digital camera 3012. Also, any errors which may be caused upon operations of the digital camera 3012 and the control panel of the printer at the same time can be prevented.

Figure 6:
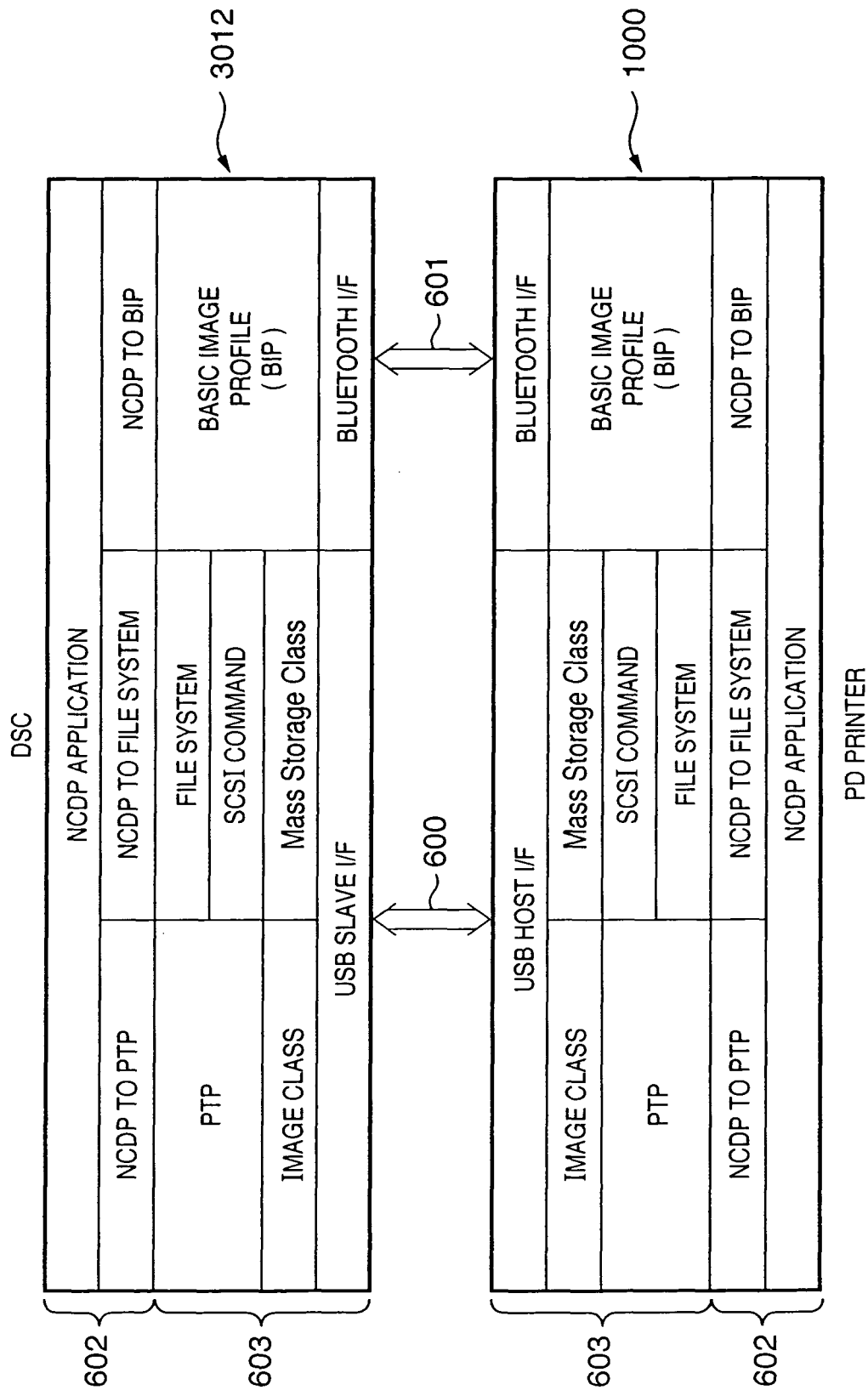
FIG. 6 shows the protocol stack of an NCDP (New Camera Direct Print) system installed in the PD printer and digital camera according to the embodiment of the present invention.

FIG. 6 shows the protocol stack of the NCDP system installed in the PD printer 1000 and digital camera 3012 of this embodiment. The NCDP system of this embodiment is a system independent from the types of communication interfaces, as shown in FIG. 6.

Referring to FIG. 6, reference numeral 600 denotes a USB interface; and reference numeral 601 denotes a Bluetooth interface. Reference numeral 602 denotes an application layer which is built in upon forming a system in the NCDP system. Reference numeral 603 denotes a layer that implements existing protocols and interfaces. In FIG. 6, PTP (Picture Transfer Protocol), SCSI, BIP (Basic Image Profile) of Bluetooth, and the like are installed. The NCDP system is premised on installation as an application on the architecture of the above protocol layer and the like. In this case, the PD printer 1000 is specified as a USB host, the camera 3012 is specified as a USB device, and they have the same NCDP system configurations, as shown in FIG. 6.

As will be described in detail later, a merit of use of the NCDP system lies in the operations that occur that when the PD printer 1000 and digital camera 3012 exchange information with each other at the time of and after making transition to the NCDP system: a file (e.g., text file) which describes a series of pieces of information and a series of operation procedures as a script is generated; that file is sent to a partner device: and the receiving side interprets the received script to execute processes. As a result, when arbitrary information is to be sent to the partner side, if that information consists of a plurality of elements, individual elements need not be exchanged by a handshake operation, and the overhead upon information transfer can be reduced, thus improving the information transfer efficiency. For example, assume that there are a plurality of images to be printed on the digital camera 3012 side. In such case, if the user selects images to be printed as much as he or she wants, and sets print conditions for these images, a series of print procedures are described as a script, and that script can be sent to the PD printer 1000. The PD printer 1000 side interprets the received script, and executes designated print processes.

FIG. 7 is a view for explaining the flow of communication procedures between the PD printer 1000 and digital camera3012 in the NCDP system.

In this case, when it is detected that the PD printer 1000 and digital camera 3012 are connected via the USB cable 5000, as shown in FIG. 5, a communication between these devices is allowed. As a result, applications installed in these devices are executed to start transition to procedures 701 in the NCDP system. Reference numeral 702 denotes an initial state of the NCDP system. In this state, it is determined whether or not each others models can implement the NCDP system. If the NCDP system can be implemented, the devices make the transition to the procedures 701. If the digital camera 3012 does not install any NCDP system, no communication control in the NCDP system is executed. After transition to the NCDP system is made in this way, when the digital camera 3012 issues a transfer/print instruction of a digital image based on "BASIC PROCEDURE", as indicated by 703, the control shifts to a simple print mode in which a digital image is transferred from the digital camera 3012 to the PD printer 1000, and is printed. On the other hand, when the digital camera 3012 issues a transfer/print instruction of a digital image based on "RECOMMENDED PROCEDURE", as indicated by 704, the control shifts to a print mode corresponding to diversified functions, in which the digital camera 3012 and PD printer 1000 perform various negotiations to determine the print condition and the like, a digital image is transferred from the digital camera 3012 to the PD printer 1000, and the digital image is printed. When the digital camera 3012 issues an instruction based on "EXTENDED PROCEDURE", as indicated by 705, a mode that executes a print process using an advanced layout function such as DPOF, XHTML-print, SVG, or the like and specifications unique to each vendor is set. Note that the detailed specifications based on this "EXTENDED PROCEDURE" are specified in the specifications of each individual manufacturer of the digital camera 3012, and a description thereof will be omitted.

FIG. 8 shows commands specified in the NCDP system.

Referring to FIG. 8, "corresponding mode" corresponds to the above "BASIC PROCEDURE", "RECOMMENDED PROCEDURE", and "EXTENDED PROCEDURE" designated from the digital camera 3012. In "RECOMMENDED PROCEDURE", all commands can be used. However, since "BASIC PROCEDURE" is a simple print mode, only start and end commands of the NCDP system, a start command of each of "BASIC PROCEDURE", "RECOMMENDED PROCEDURE", and "EXTENDED PROCEDURE" modes, an acquisition command of a digital image from the camera 3012, and a print command from the camera 3012 can be used. In "EXTENDED PROCEDURE", only start and end commands of the NCDP system, and a start command of each of "BASIC PROCEDURE", "RECOMMENDED PROCEDURE", and "EXTENDED PROCEDURE" modes are allowed to be used in FIG. 8. However, as described above, other commands may be used in accordance with the specifications of respective manufacturers.

The print sequence based on "BASIC PROCEDURE" of the NCDP system will be described below with reference to FIG. 9. This "BASIC PROCEDURE" is a simple print mode in which one image file is transferred from the digital camera 3012 to the PD printer 1000 and is printed. Compatible image formats include an RGB image of the VGA size (640×480 pixels) and a JPEG image of the VGA size (640×480 pixels). The digital camera 3012 transmits data in an image format supported by the PD printer 1000. In this case, no error handling is executed.

The PD printer 1000 sends a command (NCDPStart) indicating transition to the NCDP system to the digital camera 3012 (phase 900). If the digital camera 3012 installs the NCDP system, it replies "OK" (phase 901).

Figure 12:
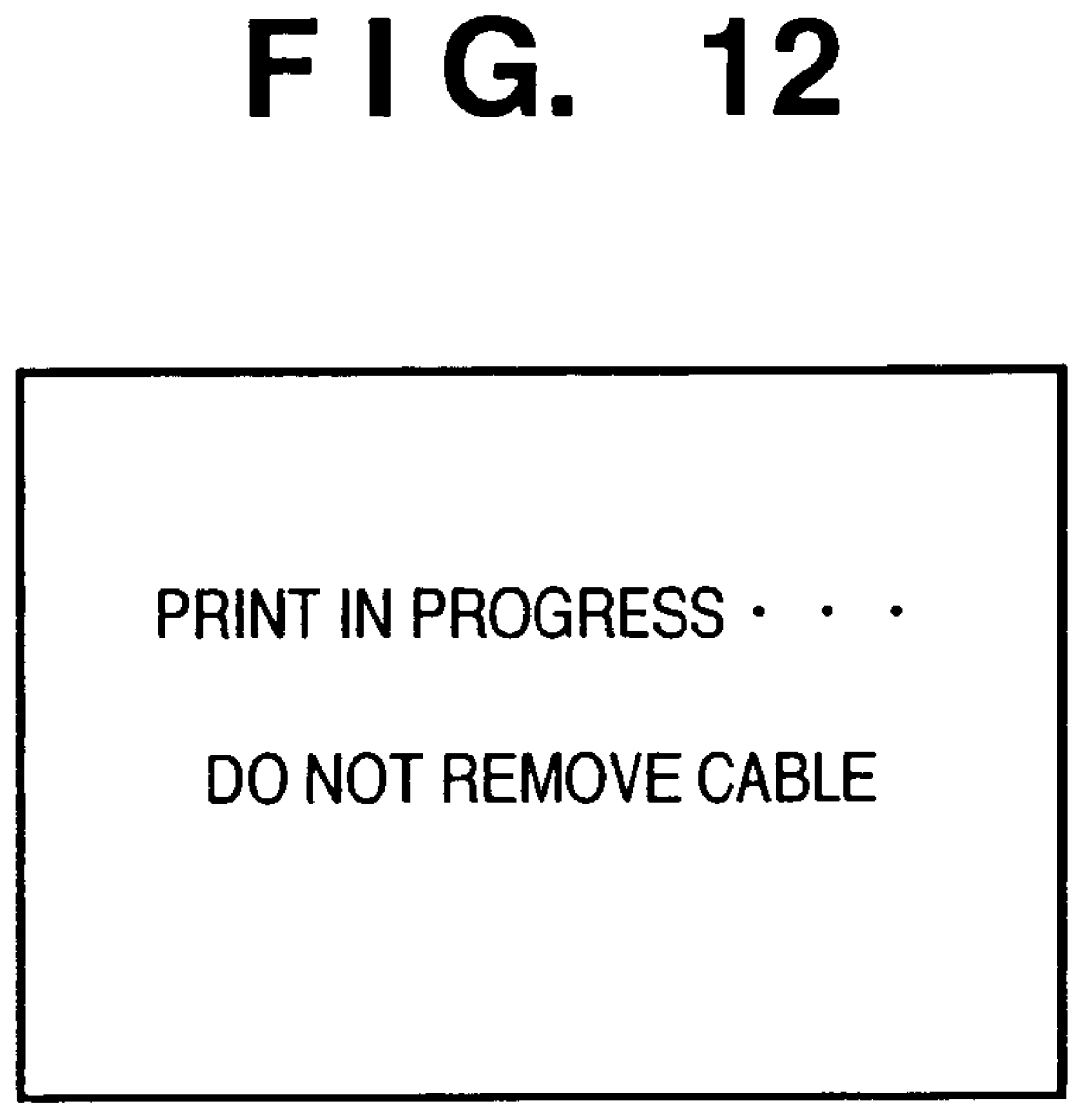

If it is confirmed by each other that the NCDP system is installed, the PD printer 1000 transmits a command (ProcedureStart) to the digital camera 3012 to make the transition to a given mode (phase 902). In response to this command, when the digital camera 3012 transmits "BASIC PROCEDURE" as a simple print mode in phase 903, the control shifts to a print mode based on "BASIC PROCEDURE". In this case, when an image to be printed is selected and its print instruction is issued upon operation on the digital camera 3012, a command (JobStart) indicating the start of a print job is sent from the digital camera 3012 to the PD printer 1000 (phase 904). That is, the digital camera 3012 informs the PD printer 1000 of the presence of an image to be printed. At this time, the digital camera 3012 is set in a photographing inhibition state (or a state that disables selection of an operation mode that allows photographing), and displays, on the display 35, information (which may be either a message or mark) which restricts to disconnect the cable 5000 from the digital camera 3012 or PD printer 1000. FIG. 12 shows an example of information displayed on the display 35 at that time.

Upon receiving the JobStart command, the PD printer 1000 is set in the simple print mode, and sends a command (GetImage) to the digital camera 3012 to request it to send a digital image (corresponding to job data) to be printed (phase 905). At the same time, the PD printer 1000 starts paper feed. Upon reception of the GetImage command, the digital camera 3012 begins to send a digital image to be printed to the PD printer 1000 (phase 906). Upon reception of the digital image to be printed, the PD printer 1000 starts a print process on the fed print medium.

After all digital images to be printed have been received, the PD printer 1000 sends a command (JobDataDone) indicating that all job data have been received to the digital camera 3012 (phase 909). Upon reception of the JobDataDone command, the digital camera 3012 is set in a photographing ready state (or a state that enables selection of an operation mode which allows photographing), and displays, on the display 35, information indicating that the cable 5000 can be disconnected from the digital camera 3012 or PD printer 1000, and information indicating that the camera is ready to photograph (each of these information may be either a message or mark). FIG. 13 shows an example of information displayed on the display 35 at that time (details will be described later).

Upon completion of the print job of the digital image to be printed, the PD printer 1000 sends a command (JobEnd) indicating the end of the print job to the digital camera 3012 (phase 907). When the digital camera 3012 returns an affirmative response (OK) in response to this command (phase 908), the print process based on this "BASIC PROCEDURE" ends.

The aforementioned process is repeated every time an image to be printed is selected on the digital camera 3012 side.

Since image data sent from the digital camera 3012 is a JPEG file, the numbers of pixels in the horizontal and vertical directions (image size) of the image are described in its header. Therefore, the PD printer 1000 can detect reception of full data of one image based on the number of packets received since first reception. Even a printer of a type that ejects inks like the PD printer 1000 of this embodiment comprises an internal reception buffer, temporarily stores received data in that buffer, and executes a print process while decoding the data in the buffer. Therefore, the transfer completion timing of one image from the digital camera 3012 to the PD printer 1000 is sufficiently earlier than the completion timing of an actual print process.

Hence, on the user side, the digital camera 3012 need not be kept connected to the PD printer 1000 via the cable 5000 after completion of transmission of the last image to be printed until completion of the print process of that image, and such connection is preferably avoided in terms of energy savings of the digital camera 3012, which is basically battery-driven.

Upon reception of one image, the PD printer 1000 of this embodiment transmits the JobDataDone command to the digital camera 3012, as shown in FIG. 9 even when the print process is not completed (in progress). Upon reception of this command, the digital camera 3012 is set in a photographing ready state (or a state that enables selection of an operation mode which allows photographing). Then, the digital camera 3012 displays, on the display 35, information indicating that the cable 5000 can be disconnected, and information indicating that the camera is ready to photograph (or can be switched to an operation mode that allows photographing) (e.g., a message shown in FIG. 13).

The image print sequence based on "RECOMMENDED PROCEDURE" in the NCDP system will be described below with reference to FIG. 10. The same reference numerals in FIG. 10 denote procedures common to those in FIG. 9, and a description thereof will be omitted. In "RECOMMENDED PROCEDURE" of the NCDP system, a "more diversified print" mode premised on negotiation between the PD printer 1000 and digital camera 3012 can be set, and photo print and layout print processes of a plurality of images can be made. Also, error handling can be executed.

In FIG. 10, after the PD printer 1000 and the digital camera 3012 confirm each other that the NCDP is installed as in FIG. 9, the digital camera 3012 designates "RECOMMENDED PROCEDURE" (phase 910) in this case. The PD printer 1000 generates Capability information which contains information associated with its functions, and directly transmits it to the digital camera 3012 (phase 911). The Capability information contains information associated with the types and sizes of paper sheets that the PD printer 1000 can handle, information associated with print quality, information associated with an image data format that the PD printer 1000 can process, ON/OFF of date print, ON/OFF of file name print, information associated with print layouts that the PD printer 1000 can process, ON/OFF of image correction, and the like. Also, the Capability information contains information associated with the types of trimming print methods that the PD printer 1000 can process. In this embodiment, the Capability information is described in XML (Extensible Markup Language) to improve expandability and portability.

Upon reception of the Capability information of the PD printer 1000, the digital camera 3012 can determine the functions of the PD printer 1000 to be used in a print process. The digital camera 3012 presents a menu according to this determination result to the user to prompt him or her to select an image to be printed. In addition, the digital camera 3012 selects and determines a print condition of that image from functions (print conditions) of the PD printer 1000. After the image to be printed, its print condition, and the like are determined, when a print start instruction is issued, a print command (JobStart) is sent to the PD printer 1000 (phase 904). At this time, the digital camera 3012 is set in a photographing inhibition state (or a state that disables selection of an operation mode that allows photographing), and displays, on the display 35, information (which may be either a message or mark) which restricts to disconnect the cable 5000 from the digital camera 3012 or PD printer 1000. FIG. 12 shows an example of information displayed on the display 35 at that time.

Upon receiving the JobStart command, the PD printer 1000 issues a command (GetImage xn) which requests n (n is an integer equal to or larger than 1) digital image(s) (corresponding to job data) to be printed (phase 912). Upon reception of the GetImage xn command, the digital camera 3012 transmits digital images to be printed to the PD printer 1000 (phase 913).

Upon reception of all the n digital images to be printed, the PD printer 1000 transmits a command (JobDataDone) indicating that all job data have been received to the digital camera 3012 (phase 909). Upon reception of the JobDataDone command, the digital camera 3012 is set in a photographing ready state (or a state that enables selection of an operation mode which allows photographing), and displays, on the display 35, information indicating that the cable 5000 can be disconnected from the digital camera 3012 or PD printer 1000, and information indicating that the camera is ready to photograph (each of these information may be either a message or mark) as in "BASIC PROCEDURE" described above. FIG. 13 shows an example of information displayed on the display 35 at that time.

Upon completion of the print jobs of the digital images to be printed, the PD printer 1000 sends a command (JobEnd) indicating the end of the print jobs to the digital camera 3012 (phase 907). When the digital camera 3012 returns an affirmative response (OK) in response to this command (phase 908), the print process based on "RECOMMENDED PROCEDURE" ends.

In this way, the PD printer 1000 of this embodiment can inform the digital camera of completion of reception of a digital image in NCDP "BASIC PROCEDURE" and "RECOMMENDED PROCEDURE".

Figure 14:
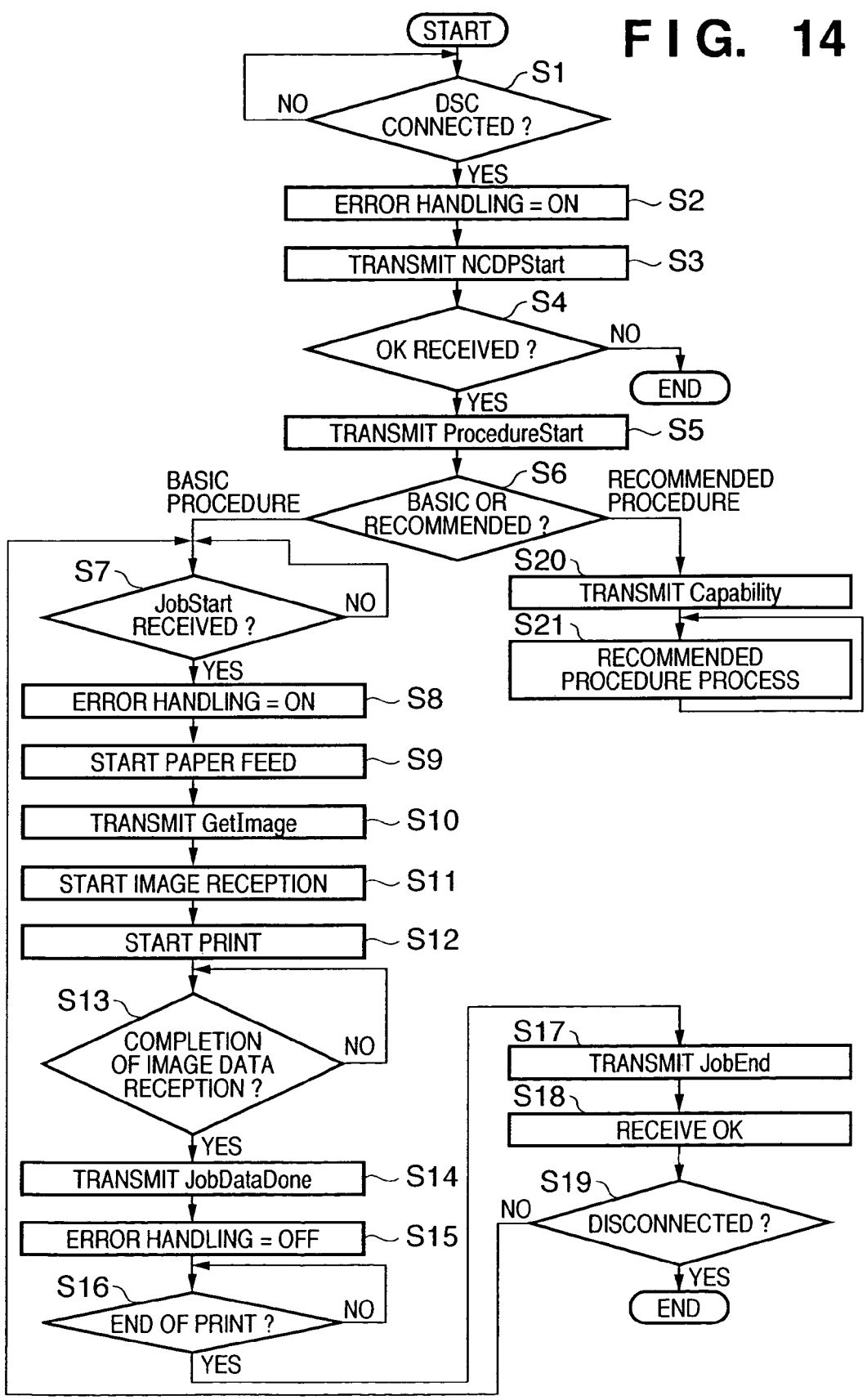
FIG. 14 is a flow chart showing the processing sequence of the printer according to the embodiment of the present invention.
Figure 15:
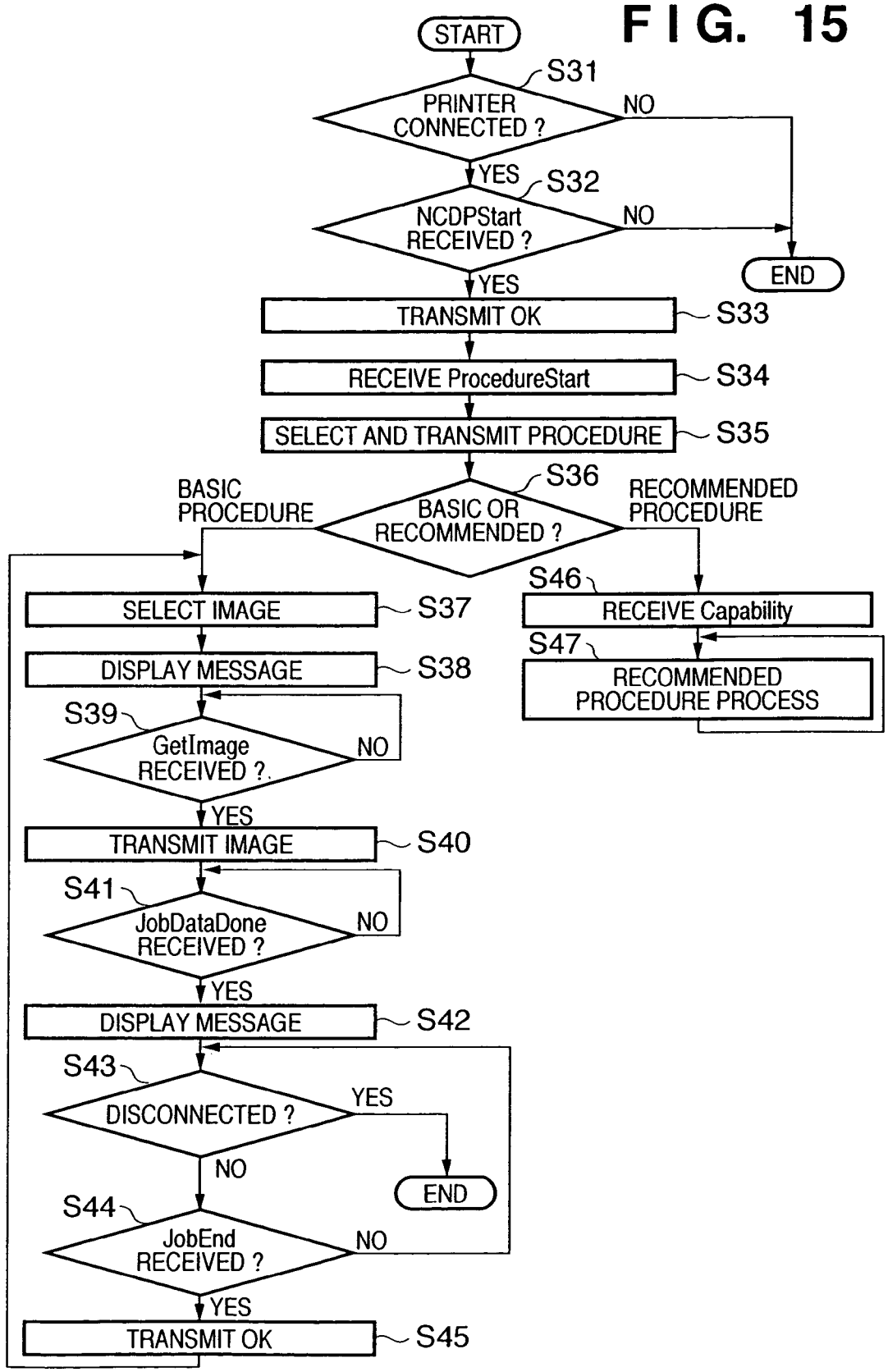
FIG. 15 is a flow chart showing the processing sequence of the digital camera according to the embodiment of the present invention.

The detailed processing sequences of the PD printer 1000 and digital camera 3012 required to implement the aforementioned processes will be described below using FIGS. 14 and 15.

The processing sequence of the CPU 3002 in the PD printer 1000 of this embodiment will be described first with reference to the flow chart of FIG. 14.

Upon detection of connection to the digital camera 3012 in step S1, the CPU enables error handling for subsequent communications in step S2. As a result, if any mismatch has occurred in a communication, a process such a retry process or the like is made.

The flow advances to step S3 to transmit an NCDPStart command to confirm if the connected digital camera is compatible to NCDP. In step S4, the CPU waits for reception of an "OK" acknowledge for a predetermined period of time. If no "OK" acknowledge is received, it is determined that the connected digital camera 3012 is incompatible to NCDP, and this process ends.

If it is determined that the connected digital camera 3012 is compatible to NCDP, the flow advances to step S5 to transmit a ProcedureStart command to inquire a procedure to be used. If the digital camera 3012 designates "BASIC PROCEDURE", the flow advances from step S6 to step S7 to execute the following "BASIC PROCEDURE" process.

In step S7, the CPU waits for reception of a JobStart command. Upon reception of the JobStart command, the CPU enables error handling in step S8, and starts paper feed in step S9. The reason why error handling is enabled in step S8 is to cope with a case wherein the flow returns from step S19 (to be described later) to step S7.

The flow advances to step S10 to transmit a GetImage command to request the digital camera to send a selected image. The CPU starts reception of image data in step S11, and starts a print process in step S12. The CPU waits until it is determined in step S13 that reception of image data is complete. Note that the reception and print processes are done as independent tasks until it is determined in step S13 that reception of image data is complete.

If it is determined that reception of image data is complete (the print process is incomplete), the flow advances to step S14 to transmit a JobDataDone command indicating that the cable can be disconnected. In step S15, the CPU disables subsequent error handling.

In step S16, the CPU waits for completion of the print process. Upon completion of the print process, the CPU transmits a JobEnd command in step S17, and executes an "OK" reception process in step S18. Since error handling has been disabled, whether or not the JobEnd command is normally transmitted and "OK" is normally received is not in question. As for OK reception, the control waits for reception for an appropriate period of time, and the flow advances to step S19 irrespective of whether or not OK is received.

The CPU checks in step S19 if connection to the digital camera 3012 via the cable is disconnected. If it is determined that the digital camera is disconnected, this process ends. On the other hand, if it is determined that the digital camera is still connected, the flow returns to step S7. Upon reception of a print instruction of the next image (upon reception of a JobStart command), the CPU enables error handling again (S8).

On the other hand, if it is determined in step S6 the digital camera 3012 designates "RECOMMENDED PROCEDURE", the flow advances to step S20 to transmit Capability information indicating the functions of the PD printer 1000. In step S21, the same processes as in steps S7 to S19 described above are executed. However, in step S21 various kinds of setup information and a plurality of image data can be received from the digital camera unlike in the above processes.

The process of the digital camera 3012 of this embodiment will be described below with reference to the flow chart of FIG. 15.

The CPU of the digital camera checks in step S31 if the digital camera is connected to a device. If it is determined that the digital camera is not connected to any device, this process ends.

The CPU checks in step S32 if an NCDPStart command is received. If this command is not received, it is determined that the connected device is at least an NCDP incompatible device, and this process ends. Upon reception of the NCDPStart command, it is determined that the connected PD printer 1000 is an NCDP compatible printer, and the CPU transmits a signal "OK" indicating that the NCDPStart command has been received in step S33.

Upon reception of a ProcedureStart command in step S34, the CPU selects one of "BASIC PROCEDURE" and "RECOMMENDED PROCEDURE" and transmits the selection result to the PD printer 1000 in step S35. If the digital camera 3012 supports only "BASIC PROCEDURE", this selection process is skipped, and "BASIC PROCEDURE" is unconditionally transmitted upon reception of the ProcedureStart command.

If "BASIC PROCEDURE" is selected as a print processing mode, the flow advances to step S37 to execute a process for prompting the user to select an image to be printed from those stored in the memory card 40 using the display 35 and switches 34 and to transmit a JobStart command. The flow then advances to step S38 to set the digital camera 3012 in a photographing inhibition state (or a state that disables selection of an operation mode that allows photographing), and to display the message shown in FIG. 12 on the display 35. The flow then advances to step S39 to wait for reception of a GetImage command from the PD printer 1000.

Upon reception of the GetImage command, the flow advances to step S40 to transmit image data selected in previous step S37. In step S41, the control waits for reception of a JobDataDone command indicating completion of reception. Upon reception of the JobDataDone command, the flow advances to step S42 to set the digital camera 3012 in a photographing ready state (or a state that enables selection of an operation mode which allows photographing), and to display the message shown in FIG. 13 on the display 35. The CPU checks in step S43 if the cable 5000 is disconnected, and waits in step S44 for reception of a JobEnd command as a print end message. If disconnection of the cable 5000 is detected while waiting for reception of the JobEnd command, this process ends. If connection is maintained, and the JobEnd command is received, the CPU replies "OK", and the flow returns to step S37 to allow the user to select the next image.

On the other hand, if "RECOMMENDED PROCEDURE" is selected as a print mode in step S36, the flow advances to step S46 to receive Capability information of the PD printer 1000. The flow then advances to step S47 to execute the same processes as in steps S37 to S45 described above. In "RECOMMENDED PROCEDURE", a plurality of images can be printed at the same time, and various print conditions (print size and the like) using the functions of the PD printer 1000 can be set. Hence, these processes are done by a process corresponding to step S37.

As described above, according to the digital camera 3012 of this embodiment, completion of reception of a digital image by the PD printer 1000 can be detected before completion of a print process of that digital image. Hence, the digital camera can inform the user that the cable 5000 can be disconnected from the digital camera 3012 or PD printer 1000 before completion of the print process of the digital image. In addition, it is guaranteed that no communication errors occur. As a result, the user can quickly start photographing and can be prevented from losing a shutter chance as much as possible.

According to the digital camera 3012 of this embodiment, completion of reception of a digital image by the PD printer 1000 can be detected before completion of a print process of that digital image. Hence, the digital camera can inform the user that the camera is ready to photograph before completion of the print process of that digital image. As a result, the user can quickly start photographing and can be prevented from losing a shutter chance as much as possible.

In this embodiment, the PD printer 1000 and digital camera 3012 are directly connected via a digital interface complying with USB (Universal Serial Bus). However, the present invention is not limited to such a specific interface. For example, the PD printer 1000 and digital camera 3012 may be directly connected via a wireless interface complying with Bluetooth, IEEE802.11, or the like. In such embodiment, the digital camera 3012 informs the user as to whether or not he or she can bring the digital camera 3012 outside the communication area with the PD printer 1000, which operation takes the place of the operation of informing the user of whether or not the cable 5000 can be disconnected. For example, after transmission of the JobStart command, the digital camera 3012 is set in a photographing inhibition state (or a state that disables selection of an operation mode that allows photographing), and displays, on the display 35, information (which may be either a message or mark) which restricts bringing the digital camera 3012 outside the communication area. FIG. 16 shows an example of information displayed on the display 35 at that time. After reception of the JobDataDone command, the digital camera 3012 is set in a photographing ready state (or a state that enables selection of an operation mode which allows photographing), and displays, on the display 35, information indicating that the digital camera 3012 can be brought outside the communication area, and information indicating that the camera is ready to photograph (or can be switched to an operation mode that allows photographing) (each of these information may be either a message or mark). FIG. 17 shows an example of information displayed on the display 35 at that time. According to such embodiment, the user can bring the digital camera 3012 outside the communication area before completion of the print process of a digital image transmitted from the digital camera 3012 to the PD printer 1000, and can quickly take the next photo.

In this embodiment, the method of displaying, on the display 35, a message or mark indicating that the cable 5000 can be disconnected from the digital camera 3012 or PD printer 1000 has been explained. Alternatively, a voice message indicating that the cable 5000 can be disconnected from the digital camera 3012 or PD printer 1000 may be output from a loudspeaker of the digital camera 3012.

The embodiment of the present invention is not limited to the system built by the digital camera 3012 and PD printer 1000. For example, the embodiment of the present invention can be applied to a system which comprise the digital camera 3012, and a storage device that records a digital image directly transmitted from the digital camera 3012 on a randomly accessible recording medium. In such embodiment, after transmission of the JobStart command to the storage device, the digital camera 3012 is set in a photographing inhibition state (or a state that disables selection of an operation mode that allows photographing), and displays the message shown in FIG. 12 or 16 on the display 35. Also, after reception of the JobDataDone command from the storage device, the digital camera 3012 is set in a photographing ready state (or a state that enables selection of an operation mode which allows photographing), and displays the message shown in FIG. 13 or 17 on the display 35. According to such embodiment, the user can quickly take the next photo before completion of recording of a digital image transmitted from the digital camera 3012 to the storage device on the recording medium.

The first embodiment can be practiced using an image input apparatus having the same functions as those of the DSC 3012 in place of the DSC 3012. Also, the first embodiment can be practiced using an image output apparatus having the same functions as those of the PD printer 1000 in place of the PD printer 1000.

As many apparently widely different embodiments of the present invention can be made without departing from the spirit and scope thereof, it is to be understood that the invention is not limited to the specific embodiments thereof except as defined in the claims.

What is claimed is:

1. A digital camera for being directly connected to a printer, and for directly transmitting an image stored in a memory that stores images to the printer, comprising:
   a display unit that displays an image stored in the memory;
   a selection unit configured to select an image to be printed from among images displayed by said display unit, after communication between said digital camera and the printer is established;
   a print instruction transmitting unit configured to transmit, to the printer, a print instruction indicating that the image selected by said selection unit is to be printed;
   an image transmitting unit configured to transmit, in response to receiving from the printer a request for transmitting the image to be printed, the requested image to the printer;
   a reception unit configured to receive from the printer a message indicating the status of the printer; and
   a control unit configured to, in response to receipt by said reception unit of a reception end message indicating that all data of the image to be printed was received by the printer, keep the communication connection between said digital camera and the printer and display on said display unit a notice indicating that the communication between said digital camera and the printer can be disconnected by a user's operation before completion of a print process by the printer of the image to be printed, until the communication connection between said digital camera and the printer is disconnected by the user's operation or said reception unit receives a print completion message indicating that the print process of the image has been completed, and in response to receipt by said reception unit of the print completion message during the communication when said digital camera is connected to the printer, stop the notice display by said display unit, display an image, and enable the selection of another image to be printed by said selection unit.

2. The digital camera according to claim 1, wherein said control unit displays information indicating that the user may disconnect said digital camera and the printer and may operate said digital camera for sensing an image in response to receiving the reception end message from the printer.

3. The digital camera according to claim 1, wherein said digital camera and the printer are connected by a cable, and said control unit displays information indicating that the cable can be disconnected in response to receiving the reception end message from the printer.

4. The digital camera according to claim 1, wherein said digital camera and the printer are connected via a wireless interface, and said control unit displays information indicating that the camera can be brought outside a wireless communication area of the printer in response to receiving the reception end message from the printer.

5. The digital camera according to claim 1, wherein, after the printer sends to the digital camera the reception end message indicating that all data of the image to be printed was received by the printer, the printer continues the print process until the print process for the image to be printed is completed.

6. A method of controlling a digital camera which has a memory for storing images, can be directly connected to a printer, and has a function of directly transmitting an image to the printer, comprising the steps of:

displaying with a display unit an image stored in the memory;

selecting with the digital camera an image to be printed from among images displayed by the display unit, after communication between the digital camera and the printer is established;

transmitting to the printer a print instruction indicating that the image selected by said selecting step is to be printed;

transmitting, in response to receiving from the printer a request for transmitting the image to be printed, the requested image to the printer;

receiving from the printer a message indicating the status of the printer; and controlling the digital camera so as to, in response to receipt of a reception end message in said receiving step indicating that all data of the image to be printed was received by the printer, keep the communication connection between the digital camera and the printer, and display on the display unit a notice indicating that the communication between the digital camera and the printer can be disconnected by a user's operation before completion of a print process by the printer of the image to be printed, until the communication connection between the digital camera and the printer is disconnected by the user's operation or said receiving step receives a print completion message indicating that the print process of the image has been completed, and in response to receipt by said receiving step of the print completion message while the digital camera is connected and communicates with the printer, stop the notice display by the display unit, display an image, and enable selection of another image to be printed.

7. The method according to claim 6, wherein said controlling step controls to display information indicating that the user may disconnect the digital camera and the printer and may operate the digital camera for sensing an image in response to the camera receiving the reception end message from the printer.

8. The method according to claim 6, wherein said controlling step controls to display information indicating that a cable can be disconnected in response to receiving the reception end message from the printer when the digital camera and the printer are connected by the cable.

9. The method according to claim 6, wherein said controlling step controls to display information indicating that the digital camera can be brought outside a wireless communication area of the printer in response to receiving the reception end message from the printer when the digital camera and the printer are connected via a wireless interface.

10. The method of controlling a digital camera according to claim 6, wherein, after the printer sends to the digital camera the reception end message indicating that all data of the image to be printed was received by the printer, the printer continues the print process until the print process for the image to be printed is completed.

* * * * *